(12) United States Patent
Ponce

(10) Patent No.: US 6,581,296 B2
(45) Date of Patent: Jun. 24, 2003

(54) TAPE MEASURE WITH LASER BEAM

(76) Inventor: Felix C. Ponce, 6725 Bovey Ave., Reseda, CA (US) 91335

( * ) Notice: Subject to any disclaimer, the term of this patent is extended or adjusted under 35 U.S.C. 154(b) by 0 days.

(21) Appl. No.: 10/044,150

(22) Filed: Oct. 19, 2001

(65) Prior Publication Data

US 2002/0059735 A1 May 23, 2002

Related U.S. Application Data

(60) Provisional application No. 60/241,778, filed on Oct. 19, 2000.

(51) Int. Cl.[7] ................................................ G01B 3/10
(52) U.S. Cl. ...................................................... 33/760
(58) Field of Search ........................... 33/755, 759, 760, 33/761, 767, 768, 769, 770, DIG. 21, 668, 27.031, 27.032

(56) References Cited

U.S. PATENT DOCUMENTS

| 4,189,107 A | * | 2/1980 | Quenot et al. | 33/761 |
|---|---|---|---|---|
| 4,462,160 A | * | 7/1984 | Cohen et al. | 33/760 |
| 4,580,347 A | * | 4/1986 | McKnight | 33/760 |
| 4,944,097 A | * | 7/1990 | Kang | 33/760 |
| 5,075,977 A | * | 12/1991 | Rando | 33/227 |
| 5,430,952 A | * | 7/1995 | Betts | 33/760 |
| 5,594,993 A | * | 1/1997 | Tager et al. | 33/227 |
| 6,030,091 A | * | 2/2000 | Li | 362/109 |
| 6,223,446 B1 | * | 5/2001 | Potter | 33/764 |
| 6,256,901 B1 | * | 7/2001 | Lin | 33/767 |

* cited by examiner

*Primary Examiner*—Diego Gutierrez
*Assistant Examiner*—Yaritza Guadalupe
(74) *Attorney, Agent, or Firm*—Lewis B. Sternfels

(57) ABSTRACT

A tape measure with laser beam (10) comprises a case (12), a laser device (70) carried in the case and capable of transmitting a laser beam therefrom, and a roll (24) of measuring tape (25) supported in the case. The measuring tape roll is disposed to be rewound into the case by a conventional spring mechanism. A one-way brake (38) is couplable to the measuring tape roll for preventing rewinding of the measuring tape back into the case. A brake override 50 permits retraction of the measuring tape into the case. A second brake (92) is adapted to hold the tape measuring roll securely in place when a pencil (86) is inserted into the case. Power supply apparati, comprising parallelly connected batteries (78), solar cells (82) and a dynamo (83), are electrically coupled to the laser for enabling laser beam transmission therefrom.

8 Claims, 1 Drawing Sheet

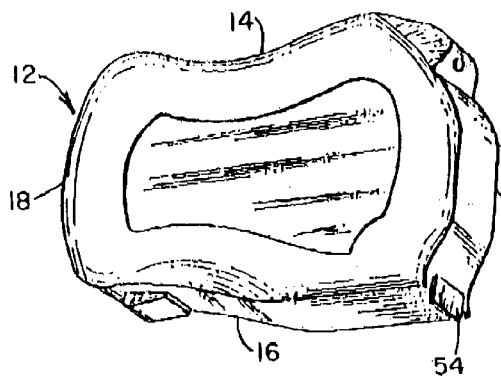
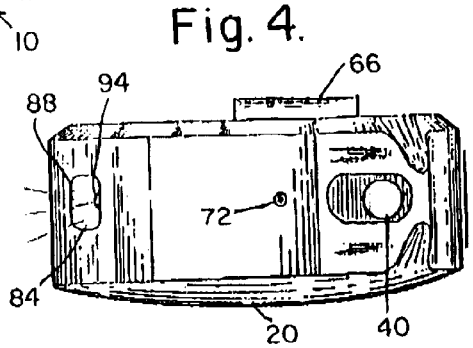
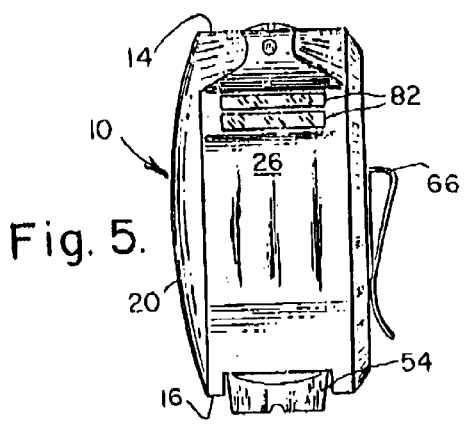
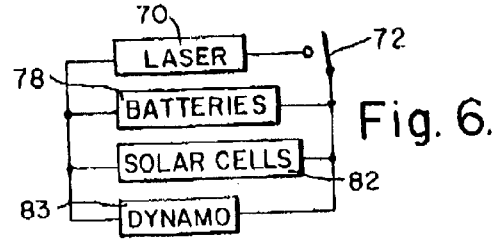
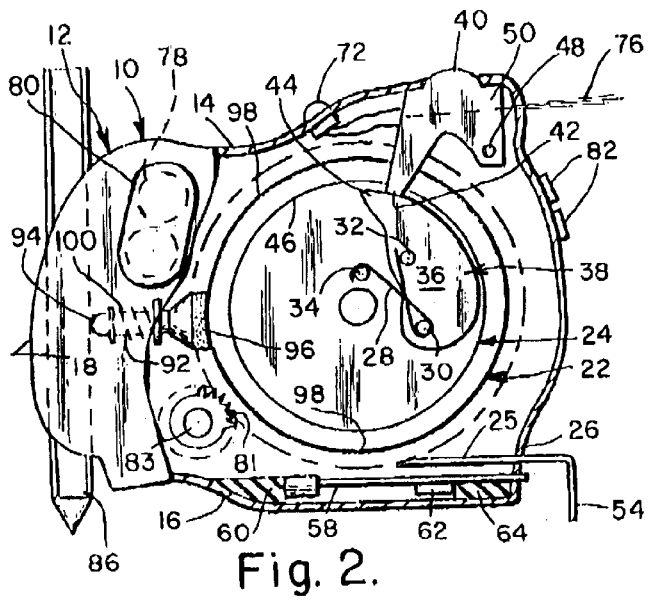
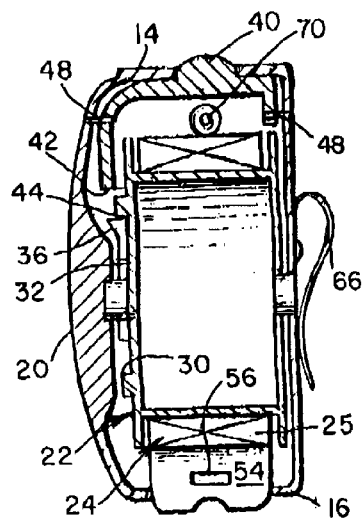

TAPE MEASURE WITH LASER BEAM

CROSS-REFERENCE TO RELATED APPLICATION

This application claims the benefit of U.S. Provisional Application No. 60/241,778, filed Oct. 19, 2000.

REFERENCE REGARDING FEDERAL SPONSORSHIP

Not Applicable

REFERENCE TO MICROFICHE APPENDIX

Not Applicable

BACKGROUND OF THE INVENTION

1. Field of the Invention

The present invention relates to a tape measure and, in particular, to a tape measure in combination with a laser device and improved holding features for preventing movement in one or another direction of a measuring tape.

2. Description of Related Art and Other Considerations

Tape measures are well known devices used to measure distances, and are useful in marking distances. While a locking device is incorporated into the tape measure to prevent any movement of the measuring tape in both directions, it is sometimes desirable that the forward motion of the tape not be impeded, so as to avoid the possibility of unwanted and annoying retraction of the tape back into its case when the locking device is released, whether inadvertent or not. As a result, the user must hold the tape with one hand, while releasing the tape locking device, a sometimes bothersome event.

A pencil or other writing implement is conventionally employed to mark the distances, and traditionally is carried separately from the tape measure. Thus, the pencil can easily be mislaid or, at least, not be conveniently at hand.

SUMMARY OF THE INVENTION

These and other problems are successfully addressed and overcome by the present invention. A tape measure with laser beam comprises a case, a laser device carried in the case and capable of transmitting a laser beam therefrom, a roll of measuring tape supported in the case, a spring mechanism in the case coupled to the measuring tape and disposed to rewind the measuring tape into the case, and power supply apparatus in the case and electrically coupled to the laser for enabling laser beam transmission therefrom.

The tape measure with laser device also includes improved holding features for preventing movement in one or another direction of the measuring tape.

Several advantages are derived from this arrangement. The tape measure enables a user to conveniently point to an object, draw marks and measure distance all in one compact device. Thus, it is no longer necessary for one to use a separate device, such as a pointer, to point to a device. Nor, need a writing instrument be required in a separate hand. Communication by use of the laser device is enhanced as a user may point to a distant object that is beyond reach of the measuring tape. The laser actuating button is designed to be positioned in a convenient position such that a user can utilize its multiple functions with one hand. In the preferred embodiment, the user can press the button to activate the laser and lock or unlock the measure tape with the same hand. In this embodiment where the push button switch is disposed adjacent to the top of the case, the user may simply press the button with his or her thumb. In an alternate embodiment where the button is disposed adjacent to a side of the case, the user may use his or her index finger or other fingers to push the button. When the tape measure is used to measure a distance, the user may simultaneously use the laser to point to a certain object. For workers who carry tape measures on tool belts that have limited capacity, this tape measure essentially provides the user with an additional, useful tool without taking up any additional space on the belt.

The present invention further increases efficiency as a user can conveniently draw marks while simultaneously taking a measurement, actions which are often done in conjunction.

Other aims and advantages, as well as a more complete understanding of the present invention, will appear from the following explanation of an exemplary embodiment and the accompanying drawings thereof.

BRIEF DESCRIPTION OF THE DRAWINGS

FIG. 1 is a perspective view of a preferred embodiment of the present invention;

FIG. 2 is a right side view of the tape measure illustrated in FIG. 1;

FIG. 3 is a cross-sectional view of the tape measure shown in FIG. 1;

FIG. 4 is a top plan view of the tape measure depicted in FIG. 1;

FIG. 5 is a bottom view of the tape measure; and

FIG. 6 is a electric diagram of an interconnection among the power supplies and the laser.

DETAILED DESCRIPTION OF THE PREFERRED EMBODIMENTS

Referring to FIGS. 1–5, a tape measure 10 comprises an ergonomic case 12 adapted for comfortably fitting with the hand of a user. Case 12 includes a top curved surface 14, a bottom curved surface 16, a back curved surface 18, and a convexly curved side surface 20. Disposed within ergonomic case 12 is an inner case 22 for housing a roll 24 of measuring tape 25. As is conventional, a spring (not shown) is coupled to the measuring tape to draw it into a rolled-up condition. Roll 24 of measuring tape 25 is disposed to exit from a front end 26 of case 12.

A spring 28 is mounted on a pivot pin 30, which is coupled to case 12, and rests at one end on another pin 32 and at the other end on a post 34 or the like which is coupled to the case 12. Pin 32 is coupled to member 36 which is adapted to pivot about pin 30. Member 36, which includes a thin plastic pad 44, forms a first brake 38, and is supported within roll 24 to apply brake friction on the roll to prevent measuring tape 25 from moving back into case 12 after it has been withdrawn from the case. First brake 38 is coupled to a button 40 which, when pressed, press nose 42 downward to release plastic pad 44 from engagement with the inner surface, denoted by indicium 46, of roll 24. This allows tape 25 to roll inwardly. Button 40 is supported by a pair of spaced adjustable pins 48 which allow a user to pivot the button 40 to provide a more convenient position for use. A stop 50 on the inner surface of case 12 limits button 40 from moving any higher is disposed in the case.

Tape 25 includes a hook 54 having an aperture 56 defined therein. A bottom stop 58 is provided for the tape. When the tape 25 is pulled out, bottom stop 58 is pushed outward by a rubber bumper 60 until protrusion 62 is stopped by contacting bottom 64 which is formed as part of case 12.

When retracted, the tape measure is ultimately stopped when hook 54 encounters bottom stop 58 which will give slightly as it is pushed into rubber bumper 60. A clip 66 is coupled to a left side of tape measure 10.

Tape measure 10 further comprises a laser 70 which is activated by a push button switch 72 operable from a top surface 74 of the tape measure. The laser emits a laser beam 76 that exits front end 26 of the tape measure. It will be appreciated that, as the laser is being activated by a user pressing on button 72 with his or her thumb, the case 12 is ergonomically shaped to receive the remainder of the user's hand such that it will not obstruct laser beam 76. The laser 70 is powered by batteries 78 which are covered by a battery cover 80. The tape measure further includes solar panels 82 to receive solar energy to power batteries 78, the laser 70, or both. Energy for the laser may be further supplied by a toothed gear 81 which rotates a dynamo 83 whenever the tape is pulled out or retracted.

A rear portion of the tape measure includes an aperture 84 for receiving a writing utensil or implement 86, such as a pencil or pen. A plastic thin vertical wall portion 88 and a rear portion or nose end 90 of a second brake 92 are disposed within aperture 84 for pressing against the utensil so as to hold it in place. Second brake 92 prevents tape roll 24 from moving when pencil 86 is in aperture 84. The pencil, when inserted in the aperture 84, contacts brake 92 at its nose end 94. This causes second brake 92 to slide forward, thereby causing brake surface 96 to contact the outer surface 98 of the roll 24. A second spring 100 biases brake 92 rearward when pencil 86 is disposed in aperture 84. It is to be understood that the aperture for receiving the writing instrument need not be disposed at the rear portion of the tape measure, but may be disposed at any portion as desired.

FIG. 6 depicts a proposed method for electrically interconnecting batteries 78, solar cells 82 and dynamo 83 in parallel for powering laser 70. In addition, the solar cells and the dynamo are capable of recharging the batteries.

In the described embodiment where the push button switch is disposed adjacent to the top of the case, the user may simply press the button with his or her thumb. In an alternate embodiment, the button can be placed adjacent to a side of the case, so that the user may use his or her index finger or other fingers to push the button.

When the tape measure is used to measure a distance, the user may simultaneously use the laser device to point to a particular object. For workers who carry tape measures on tool belts that have limited capacity, this tape measure essentially provides the user with an additional, useful tool without taking up any additional space on the belt.

The user can conveniently draw marks while simultaneously taking a measurement, actions which are often done in conjunction. The aperture for receiving the writing instrument need not be disposed at the rear portion of the tape measure, but may be disposed at any portion as desired.

Although the invention has been described with respect to particular embodiments thereof, it should be realized that various changes and modifications may be made therein without departing from the spirit and scope of the invention.

What is claimed is:

1. A tape measure with laser beam comprising:
   a case;
   a laser device carried in said case and capable of transmitting a laser beam therefrom;
   a roll of measuring tape supported in said case;
   a spring mechanism in said case coupled to said measuring tape and disposed to rewind said measuring tape into said case;
   power supply apparatus in said case and electrically coupled to said laser for enabling laser beam transmission therefrom;
   a one-way brake coupled between said case and said roll of measuring tape for enabling said measuring tape to be extended from said case, and for preventing return of said tape into said case; and
   a release mechanism coupled to said one-way brake for releasing the preventing function thereof for permitting retraction of said tape into said case;
   an aperture in said case;
   a second brake in said case having a first end engageable with said measuring tape roll, a second end extending into the aperture, and a biasing device biasing said first end from engagement with said measuring tape roll; and
   a writing implement positionable in said aperture and engageable with said second end of said second brake for effecting engagement of said first end of said second brake into engagement with said measuring tape roll.

2. A tape measure with laser beam according to claim 1 in which said power supply apparatus comprises at least one battery.

3. A tape measure with laser beam according to claim 1 in which said power supply apparatus comprises at least one solar cell.

4. A tape measure with laser beam according to claim 1 in which said power supply apparatus comprises a dynamo.

5. A tape measure with laser beam according to claim 4 further including a geared connection between said dynamo and said roll of measuring tape whereby, when said measuring tape is wound from and into said case, said dynamo is caused to operate and generate electrical energy for supply to said laser.

6. A tape measure with laser beam according to claim 1 in which said power supply apparatus comprises batteries, solar cells and a dynamo coupled in parallel to said laser for alternate powering of said laser and for enabling recharging of said batteries from said solar cells and said dynamo.

7. A tape measure with laser beam according to claim 1 further comprising a switch coupled to said laser for operation thereof.

8. A tape measure comprising:
   a case;
   a roll of measuring tape supported in said case;
   a spring mechanism in said case coupled to said measuring tape and disposed to rewind said measuring tape into said case;
   a one-way brake coupled between said case and said roll of measuring tape for enabling said measuring tape to be extended from said case, and for preventing return of said tape into said case; and
   a release mechanism coupled to said one-way brake for releasing the preventing function thereof for permitting retraction of said tape into said case;
   an aperture in said case;
   a second brake in said case having a first end engageable with said measuring tape roll, a second end extending into the aperture, and a biasing device biasing said first end from engagement with said measuring tape roll; and
   a writing implement positionable in said aperture and engageable with said second end of said second brake for effecting engagement of said first end of said second brake into engagement with said measuring tape roll.

* * * * *